(12) United States Patent
Simon

(10) Patent No.: US 6,364,977 B1
(45) Date of Patent: Apr. 2, 2002

(54) TUNING MECHANISM AND METHOD FOR VIBRATION WELDING

(75) Inventor: William P. Simon, New Milford, CT (US)

(73) Assignee: Sonics & Materials Inc., Newtown, CT (US)

( * ) Notice: Subject to any disclaimer, the term of this patent is extended or adjusted under 35 U.S.C. 154(b) by 0 days.

(21) Appl. No.: 09/586,630

(22) Filed: Jun. 5, 2000

(51) Int. Cl.[7] ............................................. B29C 65/06
(52) U.S. Cl. ..................... 156/64; 156/73.5; 156/351; 156/580
(58) Field of Search .................... 156/64, 73.5, 228, 156/308.2, 309.6, 350, 351, 580, 581, 583.1

(56) References Cited

U.S. PATENT DOCUMENTS

| | | | | |
|---|---|---|---|---|
| 4,468,265 A | * | 8/1984 | MacLaughlin et al. | 156/64 |
| 4,741,788 A | * | 5/1988 | Clark et al. | 156/64 |
| 5,366,580 A | * | 11/1994 | Czach | 156/359 |
| 5,858,142 A | * | 1/1999 | Tully et al. | 156/73.5 |
| 6,296,726 B1 | * | 10/2001 | Pencak | 156/64 |

* cited by examiner

*Primary Examiner*—James Sells
(74) *Attorney, Agent, or Firm*—St. Onge Steward Johnston & Reens LLC

(57) ABSTRACT

A method and apparatus for determining the resonance frequency for a vibration welder are described. The vibration frequencies at a predetermined vibration level and on both sides of the resonance frequency are derived and are then used to determine and operate the vibration welder at the resonance frequency. In one embodiment the vibration frequency of the vibration welder is swept up from one side of the resonance point and the vibration amplitude is monitored and a first frequency at a particular vibration amplitude is determined. The same sweeping is done from the other side of the resonance point and a second frequency determined for the same vibration amplitude reference level but on the other side of the resonance frequency. The two measured frequencies are then combined to yield the resonance frequency which can then be used to operate the vibration welder.

15 Claims, 2 Drawing Sheets

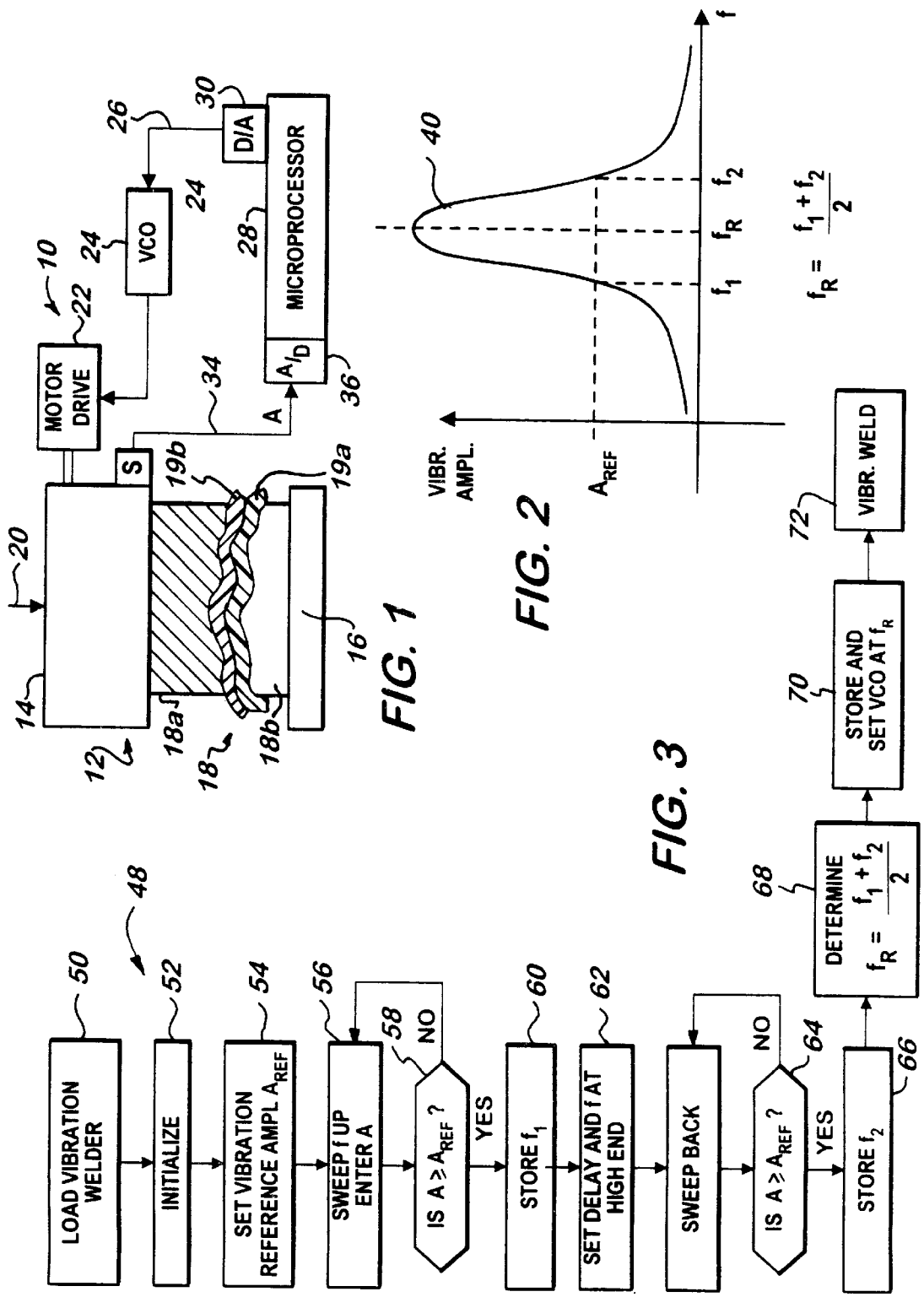

US 6,364,977 B1

TUNING MECHANISM AND METHOD FOR VIBRATION WELDING

FIELD OF THE INVENTION

This invention relates to vibration welding generally and more specifically to a method and apparatus for setting up a vibration welder to vibration weld a work-piece.

BACKGROUND OF THE INVENTION

In the operation of a vibration welder a work-piece is loaded onto the machine between fixtures on the platen, one of which is then pressed towards the work-piece. One of the platen and its associated fixture are vibrated at a mechanical resonance frequency to achieve a weld of a material to the work-piece. There are many patents describing vibration welders as well as so-called orbital welders, all of which are referred herein as vibration welders.

Since the fixture and the associated mass of the vibrating platen and mechanical springs and components are significant the amount of power needed to achieve the proper relative motion to achieve a vibration weld is also substantial. In order to obtain sufficient motion between the material and the work-piece, it is desired to operate the vibration welder at the mechanical resonance of the active platen and its fixture. Since the resonance frequency varies with different fixtures and platen loadings a common technique to determine the resonance of the vibration welder involves increasing the frequency of the vibration welder to manually determine the resonance frequency where maximum vibration amplitude occurs. This involves a somewhat slow process with a number of iterations to arrive at a proper determination of the resonance frequency since the Q value of the mechanical structure is very high and the resulting resonance curve very narrow. It is not unusual the bandwidth of the resonance curve is of the order of a fraction of a cycle or Hz.

The known manual determination of the resonance frequency is a relatively slow process and affects the efficiency of the use of the vibration welder when changes of work-pieces and fixtures requires a re-tuning of the vibration welder to a new resonance frequency associated with a new fixture and work-piece.

SUMMARY OF THE INVENTION

It is, therefore, an object of the invention to provide a method and apparatus to rapidly tune a vibration welder to its resonance frequency. It is a further object of the invention to enable a rapid automatic determination of a desired operating frequency of a vibration welder and its associated fixture. It is still further an object of the invention to rapidly determine the resonance frequency of a vibration welder and its fixture so as to reduce the set-up time for the welder.

One technique to tune a vibration welder in accordance with the invention involves selecting a vibration amplitude reference level and then begin sweeping the operating frequency of the vibration welder in one direction and storing the value of the frequency when the reference amplitude level is sensed. The operating frequency of the vibration welder is then swept in the opposite direction and the frequency is stored when again the sensed vibration amplitude matches the reference level. The desired operating frequency of the vibration welder is determined from the stored frequencies.

When the desired vibration welder operating frequency is the resonance frequency a simple arithmetic operation can be used to determine that. Thus the first and second stored frequency values are added and the sum divided by two to arrive at the resonance frequency for the vibration welder.

As a result of the invention it is not necessary to manually hunt for or determine the resonance frequency directly and the technique of the invention speeds up the determination of the proper resonance frequency. Vibration welder set ups for different work-pieces and fixtures can now be achieved more efficiently and accurately.

These and other objects and advantages of the invention can be understood from the following description of an embodiment in accordance with the invention and as illustrated in the drawings.

BRIEF DESCRIPTION OF THE DRAWINGS

FIG. 1 is a schematic representation of an apparatus used to determine the resonance frequency of a vibration welder and a fixture mounted thereto;

FIG. 2 is a plot of frequency versus amplitude to illustrate the invention;

FIG. 3 is a flow chart showing a method and programming steps used to practice the invention.

DETAILED DESCRIPTION OF THE DRAWINGS

Figure 4:
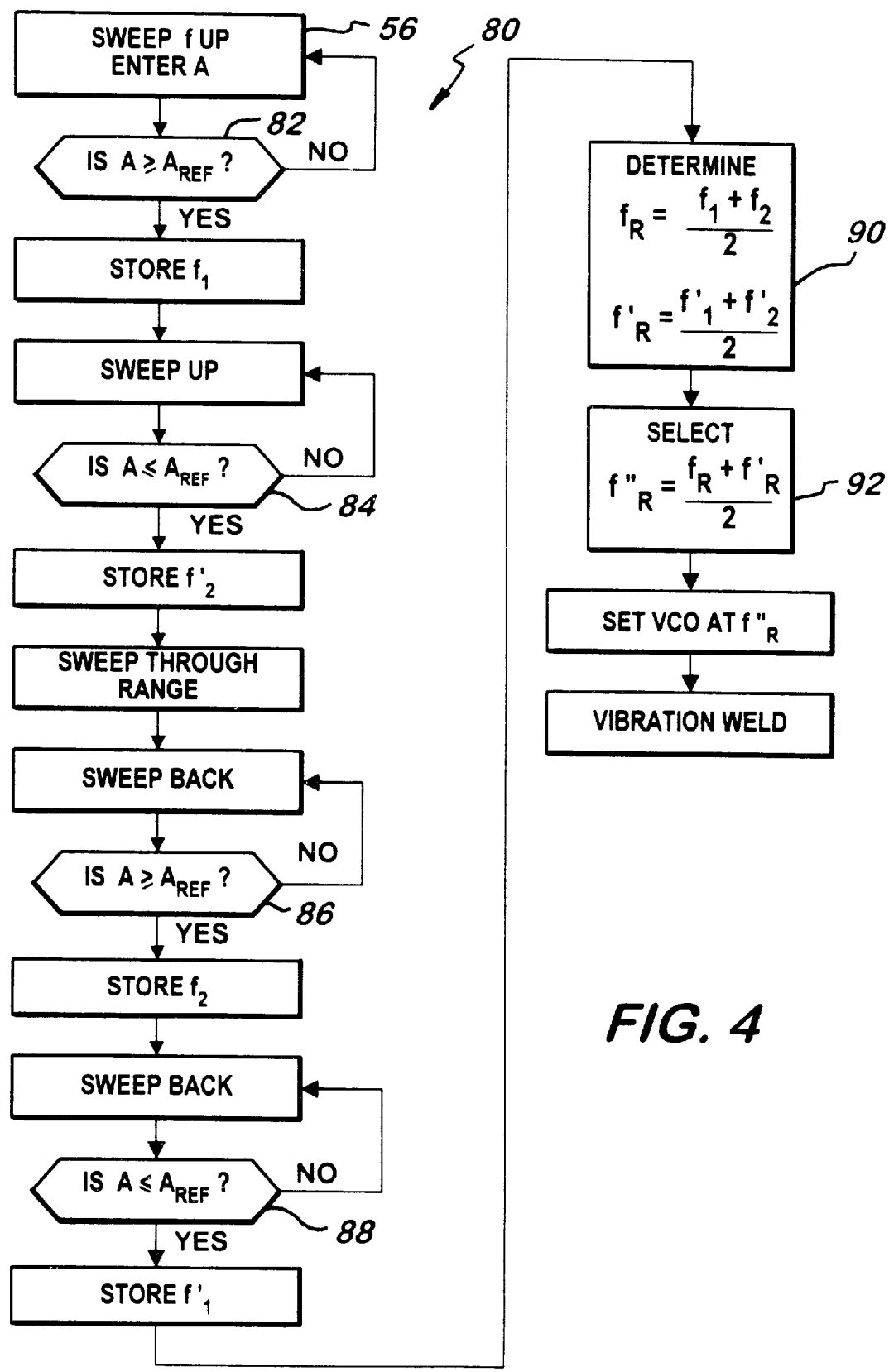
FIG. 4 is a flow chart showing additional steps in accordance with the invention to determine the resonance frequency of a vibration welder and its fixture.

With reference to FIGS. 1–3 an apparatus 10 in accordance with the invention is shown with which a desired operating frequency for a vibration welder can be rapidly determined. A vibration welder 12 is shown having an upper platen 14 and a lower platen 16 between which, a fixture 18, formed of an upper part 18a attached to platen 14 and a lower 18b attached to platen 16, is mounted under pressure as suggested with arrow 20. The work-piece typically includes a lower thermoplastic part 19a to which another material 19b is to be welded. The vibration welder 12 typically includes a motor drive 22, which is driven at a frequency to vibrate the welder at a desired operating frequency. The frequency can be selected and this illustrated in the embodiment with a voltage-controlled oscillator (VCO) 24 operated under the control of a voltage on an output line 26 from and determined by a controller such as a microprocessor 28. It is to be understood that different known techniques to vary the frequency of a motor drive can be used as well as analog circuits.

The microprocessor 28 may include a suitable D/A converter 30 with which the voltage on line 26 is obtained. A vibration sensor 32 is mounted to one of the springs or platen 14 being vibrated to produce on line 34 a signal indicative of the amplitude of the vibrations imparted by the motor drive 22. The sensed vibration signal on line 34 is applied to an input to microprocessor 28 where an analog to digital converter 36 provides a suitable digital value of the sensed vibration amplitude. The vibration sensor can be one of many devices. One suitable sensor is a linear motion sensor whose output is rectified to produce a DC signal, which then is proportional to the amplitude of the sensed vibrations. The DC signal is then converted to a digital signal by A/D converter 36.

The operation of the microprocessor 28 is programmed to determine the resonance frequency in a manner as can be understood with reference to FIG. 2. In this figure the output of the vibration sensor 16 is plotted as an amplitude signal as a function of the vibration frequency imparted by the motor drive 22. The resulting resonance amplitude curve 40 shows a typical narrow bell shape with a resonance being represented by the center of the curve at $f_R$. The resonance frequency can be determined by sweeping the motor drive 22 frequency first in one direction and storing the frequency $f_1$, if sweeping up in frequency, when the amplitude A equals or begins to exceed an amplitude reference value $A_{ref}$. A sweep in the other opposite direction is then done from a high frequency level for motor drive 22 to detect the frequency $f_2$ when the amplitude A matches or becomes greater than the same reference level $A_{ref}$. Frequency sweeps can be commenced in anyone direction.

The resonance frequency $f_R$ is determined with a signal combiner within microprocessor 28, or with an analog summer when an analog circuit is used, and operates by summing the values for $f_1$ and $f_2$ and dividing by two. The motor drive 22 is then operated at this frequency $f_R$ until a different work-piece is to be vibration welded or when the work-piece requires a new resonance frequency determination.

FIG. 3 illustrates one example of a routine 48 for the steps used in microprocessor 28 to determine the resonance frequency of the vibration welder 12 and its load or work-piece 18. At 50 the vibration welder 12 is loaded with a work-piece 18 and the platen 14, 16 applied in a manner that is well known in the art. The vibration welder and microprocessor 28 are initialized at 52 with appropriate constants and settings. One of the settings relevant to the invention is a constant representative of the amplitude reference level $A_{ref}$ shown in FIG. 2 and set at 54. This reference level is set sufficiently high to accurately enable one to determine the resonance frequency. One level can be for example set at approximately one half of the expected peak amplitude level.

The operating vibration frequency of the motor drive 22 is then swept at 56 with a frequency sweep signal generator by outputting on line 26 a voltage ramp that drives the VCO 24 from a low frequency, say 200 Hz to 250 Hz, though different ranges can be used. The starting point for a sweep is preferably set well below the resonance point where little or no vibration occurs. The generation of a sweep signal can be done with an analog sweep signal generator, but preferably is generated inside the microprocessor 28 with varying digital signals that are applied to D/A converter 30.

As the motor vibration frequency is swept the vibration sensor output 34 is entered into the processor 28 and the values A compared at 58 with the stored amplitude reference value $A_{ref}$. When the value for A either equals or becomes greater than $A_{ref}$ the value of the frequency f that caused this amplitude level to occur is stored at 60 as $f_1$. At this time the frequency sweep can be stopped and a reverse sweep implemented at 62 from a high frequency, say 250 Hz down to 200 Hz.

When the value for A again either is equal to or becomes greater than $A_{ref}$ at 64 the frequency value f that caused this amplitude level to occur is stored at 66 as $f_2$. The resonance frequency $f_R$ is then determined at 68 by obtaining the middle value by way of the relationship $f_R=(f_1+f_2)/2$ and the appropriate voltage level for this value is stored at 70 and outputted at 72 to the VCO 24 and motor drive 22 for making a vibration weld for work-piece 18. Similar work-pieces 18 can then be vibration welded at the resonance frequency $f_R$.

A particular advantageous feature of the invention resides in that the frequency sweeping in opposite directions automatically compensates for hysteresis arising from a sweep in one direction.

FIG. 4 illustrates another technique 80 to determine the resonance frequency for the vibration welder 12. In this technique, which is similar to that shown in FIG. 3, the frequency sweep is carried out throughout a range and the frequency values f1, at 82, and f2', at 84, during the up-sweep and f2, at 86, and f1', at 88, during the down sweep are stored. The resonance values FR and fR' can then be determined from the relationships set forth at 90 and combined at 92 to determine the desired resonance value and its associated voltage value.

Having thus described a technique to rapidly tune a vibration welder at the start of a set-up the advantages of the invention can be appreciated. An accurate resonance frequency can be derived and other operating frequencies selected according to any desired relationship. The invention has been described in connection with a digital microprocessor, though it is to be understood that an analog system can be employed to determine the resonance frequency of the mechanical circuit. In such case the analog to digital converters can be deleted and comparators used to detect the reference levels $f_1$ and $f_2$ with a preselected set point that represents the reference amplitude value.

Variations from the described embodiments can be implemented by one skilled in the art without departing from the scope of the invention as set forth by the following claims.

What is claimed is:

1. A method for setting the vibration frequency of a vibration welder comprising the steps of:
   sensing the vibration amplitude of the vibration welder;
   sweeping the vibration frequency of the vibration welder from a frequency that is on one side of the resonance frequency towards the resonance frequency;
   determining a first frequency of the vibration welder at a preselected vibration amplitude reference level;
   sweeping the vibration frequency of the vibration welder from a frequency that is on the opposite side relative to said one side of the resonance frequency towards the resonance frequency;
   determining a second frequency of the vibration welder at said preselected vibration amplitude reference level; and
   determining the desired vibration frequency for the vibration welder from the first and second frequencies.

2. The method defined in claim 1, further comprising the step of selecting a constant representative of the amplitude reference level.

3. The method defined in claim 2 wherein the amplitude reference level is set sufficiently high to fit along a curve that encompasses the mechanical resonance of the vibration welder.

4. The method defined in claim 1 wherein the step of determining the first frequency includes comparing the sensed vibration amplitude with the amplitude reference level and storing the first frequency when the sensed vibration amplitude is at least equal to the amplitude reference level.

5. The method defined in claim 1 wherein the step of determining the second frequency includes comparing the sensed vibration amplitude with the amplitude reference level and storing the second frequency when the sensed vibration amplitude is at least equal to the amplitude reference level.

6. The method defined in claim 1 wherein sweeping the vibration frequency includes generating a voltage ramp that controls a voltage-controlled oscillator to produce a frequency range that overlaps the mechanical resonance of the vibration welder.

7. The method defined in claim 6 wherein the voltage ramp is select to include a frequency range that extends outside the mechanical resonance of the vibration welder where little vibration occurs.

8. The method defined in claim 1 wherein the step of determining the resonance frequency includes the step of averaging the first and second frequencies.

9. A device for determining the resonance frequency of a vibration welder which has a pair of platens and a motor drive to vibrate a platen and its associated fixture at the resonance frequency, said device comprising:

a frequency varying device for controlling the vibration frequency of the vibration welder;

a sensor to generate a sensor signal representative of the sensed vibration of the welder;

a controller responsive to the amplitude signal and coupled to drive the frequency varying device, said controller storing a reference amplitude value occurring within a resonance curve for the vibration welder as represented by the sensor signal;

said controller including a comparator to detect when the sensor signal at least equals the reference amplitude value occurring on both sides of the mechanical resonance of the vibration welder and storing respectively first and second associated vibration frequencies of the frequency varying device; and with said controller including a signal combiner with which the first and second frequencies are combined to produce a resonance signal representative of the mechanical resonance of the vibration welder.

10. The device defined in claim 9 wherein the controller includes a frequency sweep signal generator that produces a signal to drive the frequency varying device from a frequency well below resonance to a higher frequency and from a frequency that is well above resonance to a lower frequency so as to respectively include at least portions of the resonance curve with which outputs are produced from the comparator indicative of the first and second vibration frequencies.

11. The device defined in claim 9 wherein the frequency varying device comprises a voltage controlled oscillator and wherein said controller generates a voltage ramps to an input of the voltage controlled oscillator.

12. The device defined in claim 9 wherein the sensor is mounted to one of the platens being vibrated in the vibration welder.

13. The device defined in claim 12 wherein the controller further has an A/D converter to convert the sensor signal to a digital equivalent.

14. The device defined in claim 9 wherein the amplitude reference value is selected sufficiently high to detect a frequency along slopes of the resonance curve.

15. The device defined in claim 9 wherein the first and second operating frequencies $f_1$ and $f_2$ are stored in the controller and the resonance frequency is determined in accordance with the formula $(f_1+f_2)/2$.

* * * * *

UNITED STATES PATENT AND TRADEMARK OFFICE
CERTIFICATE OF CORRECTION

PATENT NO. : 6,364,977 B1
DATED : April 2, 2002
INVENTOR(S) : Simon

It is certified that error appears in the above-identified patent and that said Letters Patent is hereby corrected as shown below:

<u>Title page,</u>
Item [*] Notice, delete the phrase "by 0 days" and insert -- by 11 days --

Signed and Sealed this

Twenty-eighth Day of September, 2004

JON W. DUDAS
*Director of the United States Patent and Trademark Office*